United States Patent
Willomitzer (10) Patent No.: US 10,404,967 B2
(45) Date of Patent: Sep. 3, 2019

(54) OPTICAL 3-D SENSOR FOR FAST AND DENSE SHAPE CAPTURE

(71) Applicants: Florian Willomitzer, Nuremberg (DE); Gerd Haeusler, Erlangen (DE)

(72) Inventor: Florian Willomitzer, Nuremberg (DE)

(73) Assignees: Florian Willomitzer, Nuremberg (DE); Gerd Haeusler, Erlangen (DE)

(*) Notice: Subject to any disclaimer, the term of this patent is extended or adjusted under 35 U.S.C. 154(b) by 115 days.

(21) Appl. No.: 15/442,214

(22) Filed: Feb. 24, 2017

(65) Prior Publication Data

US 2017/0251197 A1   Aug. 31, 2017

(30) Foreign Application Priority Data

Feb. 26, 2016   (DE) .................. 10 2016 002 398

(51) Int. Cl.
| | |
|---|---|
| *H04N 13/254* | (2018.01) |
| *H04N 13/239* | (2018.01) |
| *G01B 11/25* | (2006.01) |
| *H04N 5/247* | (2006.01) |

(52) U.S. Cl.
CPC ....... *H04N 13/239* (2018.05); *G01B 11/2513* (2013.01); *G01B 11/2545* (2013.01); *H04N 5/247* (2013.01); *H04N 13/254* (2018.05)

(58) Field of Classification Search
None
See application file for complete search history.

(56) References Cited

U.S. PATENT DOCUMENTS

| | | | |
|---|---|---|---|
| 7,768,656 B2 | 8/2010 | Lapa et al. | |
| 8,140,295 B2 | 3/2012 | Hebert et al. | |
| 2010/0303341 A1 | 12/2010 | Haeusler | |
| 2013/0100282 A1 | 4/2013 | Siercks | |

(Continued)

FOREIGN PATENT DOCUMENTS

| | | |
|---|---|---|
| DE | 102014104993 A1 | 12/2014 |
| WO | 2011033186 A1 | 3/2011 |

OTHER PUBLICATIONS

Willomitzer, "Single-shot three-dimensional sensing with improved data density," Virtual Journal for Biomedical Optics, Jan. 2015. (Year: 2015).*

(Continued)

*Primary Examiner* — Jayanti K Patel
*Assistant Examiner* — Shadan E Haghani
(74) *Attorney, Agent, or Firm* — Laurence A. Greenberg; Werner H. Stemer; Ralph E. Locher (57) ABSTRACT

An optical 3-D sensor for very fast, highly resolved and dense capture of the surface shape of objects in 3-D space. One image or a plurality of images recorded at the same time in a single shot method suffice for the recording. Using this, it is possible, as a matter of principle, to record 3-D data with the frame rate of the employed cameras, i.e. to build a 3-D video camera. The optical 3-D sensor has a projector projecting a line pattern onto the object, and K cameras, which each record an image of the object illuminated by the projector. The line pattern contains lines in a number of R directions and the K cameras are disposed to span up to K×R triangulation sensors. The triangulation sensors are coupled by a control and evaluation unit by way of the common line pattern.

13 Claims, 7 Drawing Sheets

(56) References Cited

U.S. PATENT DOCUMENTS

| | | | |
|---|---|---|---|
| 2014/0377716 A1 | 12/2014 | Rauscher et al. | |
| 2015/0221093 A1 | 8/2015 | Sagawa et al. | |
| 2015/0330773 A1* | 11/2015 | Uffenkamp | G01B 11/22 356/631 |
| 2015/0373320 A1* | 12/2015 | Ackerson | G06T 17/00 348/44 |
| 2016/0150226 A1* | 5/2016 | Song | H04N 13/376 348/54 |
| 2017/0069052 A1* | 3/2017 | Li | H04N 13/271 |
| 2017/0258528 A1* | 9/2017 | Bai | G02B 23/2484 |

OTHER PUBLICATIONS

Halioua et al., "Automated phase-measuring profilometry of 3-D diffuse objects," Applied Optics Sep. 15, 1984, vol. 23, No. 8, pp. 3105-3108.

Schaffer et al., "High-speed pattern projection for three-dimensional shape measurement using laser speckles", Applied Optics, Jun. 20, 2010, vol. 49, No. 18, pp. 3622-3629.

Schmalz, "Robust single-shot structured light 3D scanning", Dissertation, University of Erlangen-Nuremberg (2011) (document uploaded in 3 parts).

Nguyen et al.,"Real-time, high-accuracy 3D imaging and shape measurement," Appled Optics, Jan. 1, 2015, vol. 54, No. 1, pp. A9-A17.

Haeusler et al., "Parallel three-dimensional sensing by color-coded triangulation", Applied Optics, Dec. 10, 1993, vol. 32, No. 35, pp. 7164-7169.

Yang et al., "A 3D sensor for intraoral metrology," in DGaO Proceedings 2009, p. 19.

Zhang, "Microsoft Kinect Sensor and its Effect", IEEE Multimedia 19, 4-10 (2012).

Haeusler et al., "Why can't we purchase a perfect single-shot 3D-sensor?" in DGaO Proceedings 2012, A8.

Young et al., "Viewpoint-Coded Structured Light," in CVPR '07 IEEE Conference pp. 1-8 (2007).

Breitbarth et al. „Phase unwrapping of fringe images for dynamic 3D measurements without additional pattern projection, in SPIE Proceedings vol. 9489, 948903 1-10 (2015).

Willomitzer et al., "Single-shot 3D sensing with improved data density", Applied Optics, Jan. 20, 2015, vol. 54, No. 3, pp. 408-417.

Dorsch et al., "Laser triangulation: fundamental uncertainty in distance measurement," Applied Optics, Mar. 1, 1994, vol. 33, No. 7, pp. 1306-1314.

N. Kasuya et al., "Robust and Accurate One-shot 3D Reconstruction by by 2C1P System with Wave Grid Pattern", 3DTV-Conference, 2013 International Conference on 3D Vision, IEEE, 2013, pp. 247-254.

* cited by examiner

3-D video camera: figures

3-D video camera: figures

Figure 6

3-D video camera: figures

Figure 7

3-D video camera: figures

OPTICAL 3-D SENSOR FOR FAST AND DENSE SHAPE CAPTURE

CROSS-REFERENCE TO RELATED APPLICATION

This application claims the priority, under 35 U.S.C. § 119, of German patent application DE 10 2016 002 398.8, filed Feb. 26, 2016; the prior application is herewith incorporated by reference in its entirety.

BACKGROUND OF THE INVENTION

Field of the Invention

The invention relates to an optical 3-D sensor for highly resolved and dense capture of the surface shape of objects in 3-D space using a single shot method. The term "single shot method" means that, unlike the case in competing processes, there is no need to record a series of images, sequentially in time, for the 3-D capture; one image or a plurality of images recorded at the same time suffice. Using this, it is possible, as a matter of principle, to record 3-D data with the frame rate of the employed cameras, i.e. build a 3-D video camera. "Dense 3-D measurement" means that the object surface is sampled at very many points, preferably right up to the theoretical limit of the number admitted by the camera and physics. Competing methods are clearly a long way off this. "Highly resolving" means that the speed and the data density is not bought by compromises in the lateral resolution and depth resolution like in the case of other methods. Fine details of the object may be measured in three dimensions.

Virtually all known high-quality methods for dense 3-D measurement require a temporal sequence of N images with a recording time of $T=N \cdot T_c$, where $T_c$ is a clock rate of the employed camera or the illumination [Halioua et al., "Automated phase-measuring profilometry of 3-D diffuse objects," Appl. Opt. 23, 3105-3108 (1984)], [Schaffer et al., "High-speed pattern projection for three-dimensional shape measurement using laser speckles", Appl. Opt. 49, 3622-3629 (2010)]. The number N lies in a range from 3 to more than 30. This means that the object and the sensor must not move during the entire recording time T and the object must not deform. Hence, the 3-D measurement of, say, moving persons or a 3-D high-speed measurement for a crash test is not readily possible. This applies, in particular, because methods in which a time-varying pattern—e.g. of lines, sinusoidal strips or random patterns—is projected onto the object are used for high quality 3-D measurements. Although increasingly faster cameras are available, the available projection possibilities are unable to keep up. It is for this reason that inventions in the field of such methods have been substantially restricted, in recent years, to developing faster projection sequences. The time required to project a varying pattern sequence with a sufficient brightness (especially if various grayscale values are contained) constitutes the limiting time factor in most sequential methods. Thus, a method which (a) does not require a time varying pattern sequence and (b) supplies the 3-D data within the camera clock rate (or "video clock rate") is of great interest.

A known method which does not require a temporal sequence of recordings is the so-called light sectioning method. There, in the simplest case, a line is projected onto the object and evaluated by triangulation. In order to increase the data density, it is also possible to project a plurality of lines simultaneously. Hence, the light sectioning method has the potential for a single shot 3-D sensor. However, the so-called correspondence problem arises for dense sampling with many lines: it is necessary to identify (to "index") the individual lines in the camera image. This is usually not uniquely possible, even in the case of a small number of lines and complicated objects.

A workaround of the problem is implemented in, for example, the "flying triangulation" [cf. published patent application US 2010/0303341 A1). Only a few lines, which permit unique indexing in each recorded single shot video image, are projected. Finally, many individual images recorded in succession, each with not very dense sampling, are brought together ("registered") while the sensor is guided around the object. Using this, dense sampling of the object surface is finally obtained. Object and camera may move freely as each 3-D data point originates from only one image. However, the object needs to be rigid during the entire measurement sequence since the surface is reconstructed from a plurality of 3-D views recorded in temporal sequence. A similar method which likewise uses a registration of a plurality of single shot individual views is described in U.S. Pat. No. 8,140,295 B2.

There are also approaches for solving the correspondence problem in the case of light sectioning for individual images (single shot) such that the number of projected lines in the individual image may be increased and denser sampling is thus obtained. Such methods are usually based on encoding of the lines.

Thus, for example, the lines may be encoded by different colors [Schmalz, "Robust single-shot structured light 3D scanning", Dissertation, University of Erlangen-Nuremberg (2012)] or [Nguyen et al., "Real-time, high-accuracy 3D imaging and shape measurement," Appl. Opt. 54, A9-A17 (2015)]. Alternatively, a continuous color profile (spectrum) is projected onto the object [Häusler et al., "Parallel three-dimensional sensing by color-coded triangulation", Appl. Opt. 32, 7164-7169 (1993)].

The disadvantage of these methods is that the inherent color texture of the measured object surface may lead to noise-sensitive decoding. Furthermore, the color texture of the object is not readily acquirable by means of these methods.

Another approach to encoding lies in the intensity modulation of the projected lines [Yang et al., "A 3D sensor for intraoral metrology," in DGaO Proceedings 2009, P19] or else modulation of their spatial form [U.S. Pat. No. 7,768,656 B2]. It is clear that a modulation requires a spatial bandwidth which therefore is no longer available for a lateral highly resolved capture of the object. This may be identified by virtue of fine 3-D details no longer being visible in the aforementioned methods. The same applies to all methods of active stereo photogrammetry, in which the spatially modulated pattern is projected [Zhang, "Microsoft Kinect sensor and its effect", IEEE Multimedia 19, 410 (2012)].

Thus, the prior art shows that highly resolving methods for dense data capture require a temporal sequence of recordings, while single shot methods do not deliver dense data. This is based on a fundamental problem in information theory.

If binary patterns such as, for example, narrow bright lines in the case of the light sectioning method are projected, these cannot be arranged arbitrarily densely, gaps arise. If gray-encoded patterns, e.g. sinusoidal strips, are projected, each camera pixel may contribute to the 3-D information but it is not possible, as a matter of principle, to simultaneously obtain in one camera pixel information about the unknown background illumination, the unknown local reflection of the object surface and the unknown grayscale value of the projection pattern (this usually encodes the distance of an object point) [Häusler et al., "Why can't we purchase a perfect single-shot 3D-sensor?" in DGaO Proceedings 2012, A8]. The three unknowns render it necessary to acquire at least three suitably encoded camera recordings. As a result of the correspondence problem, significantly more recordings are usually required in the case of objects with a large measurement depth.

[Young et al., "Viewpoint-Coded Structured Light," in CVPR '07 IEEE Conference pp. 1-8 (2007)] formulate the idea of replacing the temporal sequence of recorded images with images recorded at the same time (in parallel). To this end, a plurality of cameras are arranged in a geometrically suitable manner such that unique decoding of the space is possible from the simultaneously recorded images with the aid of a suitable projected pattern. Here, the idea is, in principle, to decode $T=2^k$ depths by k cameras and using a binary (black/white) stripe grid to this end. The method has two disadvantages on account of the binary encoding: for example, at least 10 cameras are required in order to distinguish 1024 different levels in the measurement volume. The calibration and stable assembly of so many cameras is technically very demanding.

SUMMARY OF THE INVENTION

It is an object of the invention to provide an optical 3-D sensor for highly resolved and dense capture of the surface shape of objects in 3-D space using a single shot method which overcomes the above and other disadvantages associated with the prior art devices and methods.

With the above and other objects in view there is provided, in according to the invention, an optical single shot 3-D sensor for shape capture of an object, the sensor comprising:

a projector for projecting a line pattern onto the object, said projector having an optical axis, the line pattern having lines in a plurality of R line directions, with R≥2;

a plurality of K cameras, each having a respective optical axis, where K≥2, said cameras being disposed to record an image of the object illuminated by said projector; and said K cameras being arranged to span with the projector up to K×R triangulation sensors with up to K×R triangulation angles in respect of the R line directions; and a control and evaluation unit configure to process the image;

said evaluation unit coupling said triangulation sensors by way of the common line pattern.

The invention provides for an optical single shot 3-D sensor for fast and dense shape capture of the object with, at the same time, a low measurement uncertainty and a large measurement region.

The advantageous embodiment proposed in the present disclosure makes do with only two cameras and is able to distinguish several thousand levels in the measurement volume in the case of a good signal-to-noise ratio. The lateral resolution is improved because only very narrow lines are projected instead of binary black/white stripes.

Incidentally, approaches which use a plurality of cameras for removing ambiguity are also known for time sequential methods [Breitbarth et al., "Phase unwrapping of fringe images for dynamic 3D measurements without additional pattern projection", in SPIE Proceedings Vol. 9489, 948903 1-10 (2015)]. This serves to shorten the measurement sequence. However, a single shot measurement cannot be realized for the aforementioned information theory reasons.

The present invention discloses how the restrictions of the prior art may be largely overcome; that is to say, for example, it is possible to capture approximately 300 000 3-D points in a single video clock using a standard video camera with 1000×1000 pixels, with a resolution and measurement uncertainty only limited by physics. Explanations were provided that a completely dense capture, where each camera pixel individually encodes a 3-D point, is not possible without compromises using a single shot method. [Häusler et al., "Why can't we purchase a perfect single-shot 3D-sensor?" in DGaO Proceedings 2012, A8] showed that the sampling theorem theoretically permits the projection of $L_{max}=M/2$ lines using a camera with M×M pixels and, using this, the acquisition of $M^2/2$ 3-D points in a video image. In practice, $L_{pract} \approx 0.16 \times M^2$ to $0.33 \times M^2$ is realistic on account of the camera noise and the perspective shortening of the line period in the case of inclined objects.

Prior art single shot methods are still far away from this limit since, according to the prior art, the correspondence or indexing problem greatly limits the number of lines to be projected.

The present invention is based on the aforementioned principle of multi-line triangulation, in which a plurality of light lines are projected onto the object to be measured. In so doing, the object is observed by a camera at a triangulation angle θ. By projecting narrow, straight lines, the center of each line usually can be determined with an accuracy of approximately 1/10 pixel (depending on the noise in the image). This sub-pixel interpolation of the narrow line images renders possible a very low measurement uncertainty δz for the distance of the associated object point. Further, the narrow lines permit a high lateral resolution—even small surface features are measurable. Narrow lines also require less space and more lines may be projected than in the case of encoded lines. This allows more and more dense 3-D data to be acquired.

Figure 1:
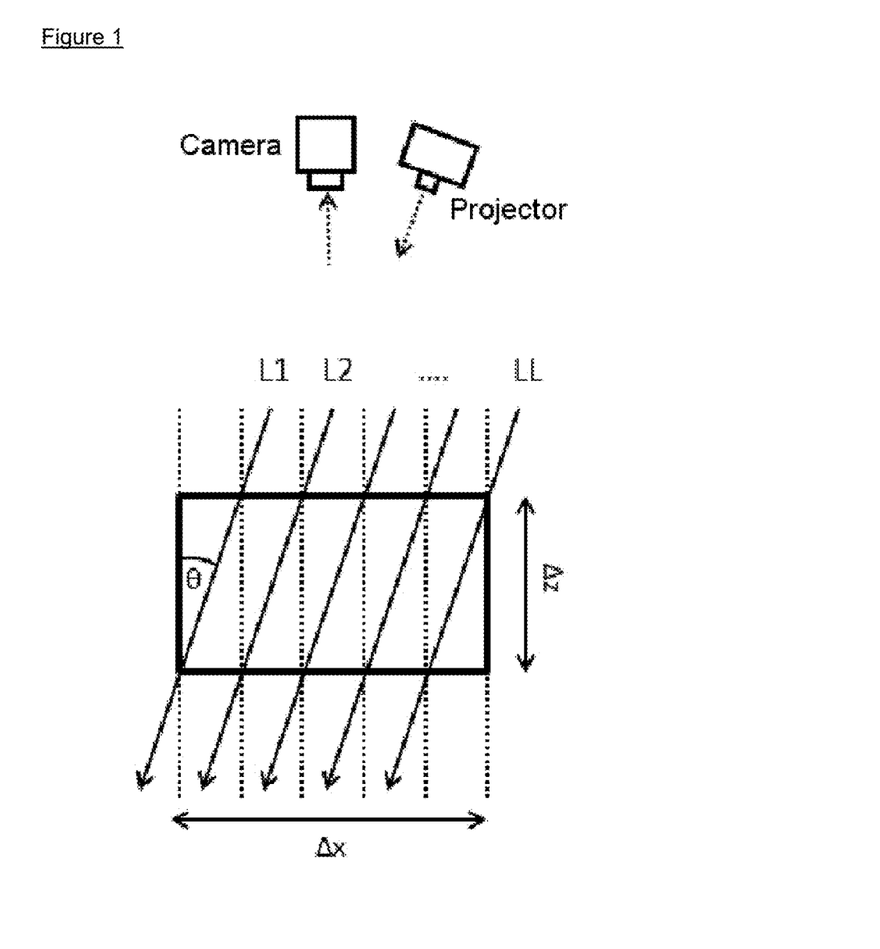
FIG. 1 is a diagrammatic view showing a system with a single camera and a projector, and visualizing the variables of Eq. 1.

The projection of narrow straight lines also has disadvantages: if the lines are not encoded, it becomes difficult with increasing line number to determine the index ("the number") of the respective line in the camera image. According to [Willomitzer et al., "Single-shot 3D sensing with improved data density", Appl. Opt. 54(3), 408-417 (2015)], the maximum number of lines to be projected for standard multi-line triangulation may be estimated according to Equation 1

$$L \leq \frac{\Delta x}{\Delta z \cdot \tan\theta}, \qquad \text{Eq. 1}$$

where L is the line number, Δx is the lateral extent of the measurement field, Δz is the unique measurement depth and θ represents the triangulation angle, see FIG. 1. A unique measurement depth means that all lines within this measurement depth may be uniquely indexed. The measurement uncertainty δz becomes smaller with increasing triangulation angle and lower noise [Dorsch et al., "Laser triangulation: fundamental uncertainty in distance measurement," Appl. Opt. 33, 1306-1314 (1994)].

Other features which are considered as characteristic for the invention are set forth in the appended claims.

Although the invention is illustrated and described herein as embodied in an optical 3-D sensor for fast and dense shape capture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Therefore, according to equation 1, a dense and simultaneously precise single shot measurement within a relatively large measurement depth is impossible using the known state of multi-line triangulation.

Figure 2:
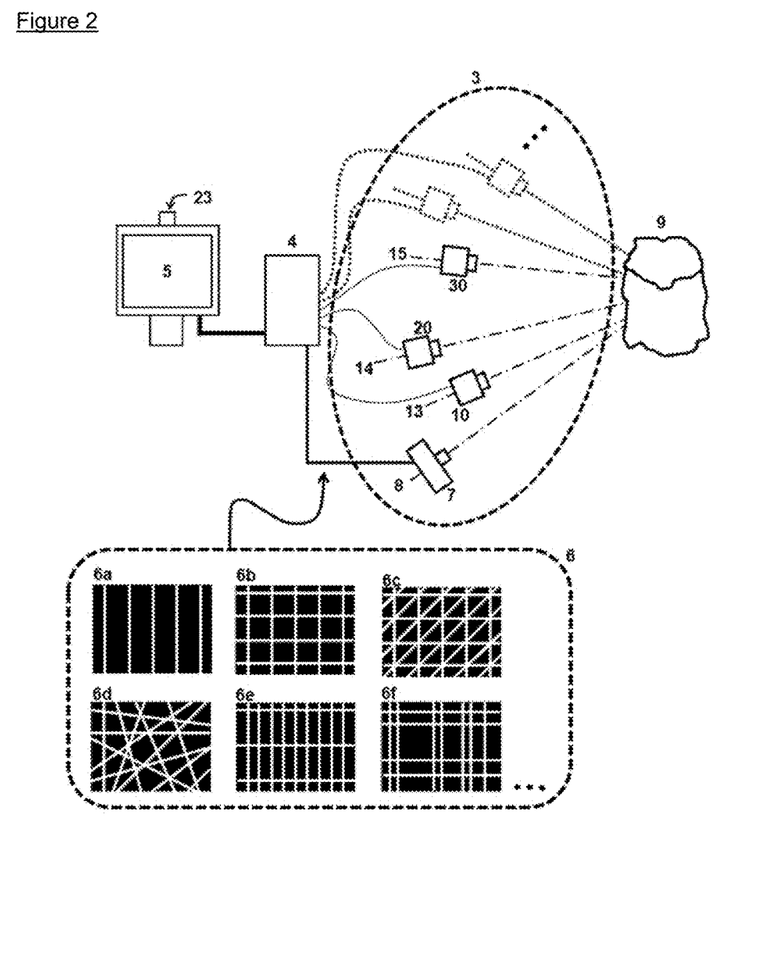
FIG. 2 is a diagrammatic view of a system according to the invention with a plurality of cameras.
Figure 3:
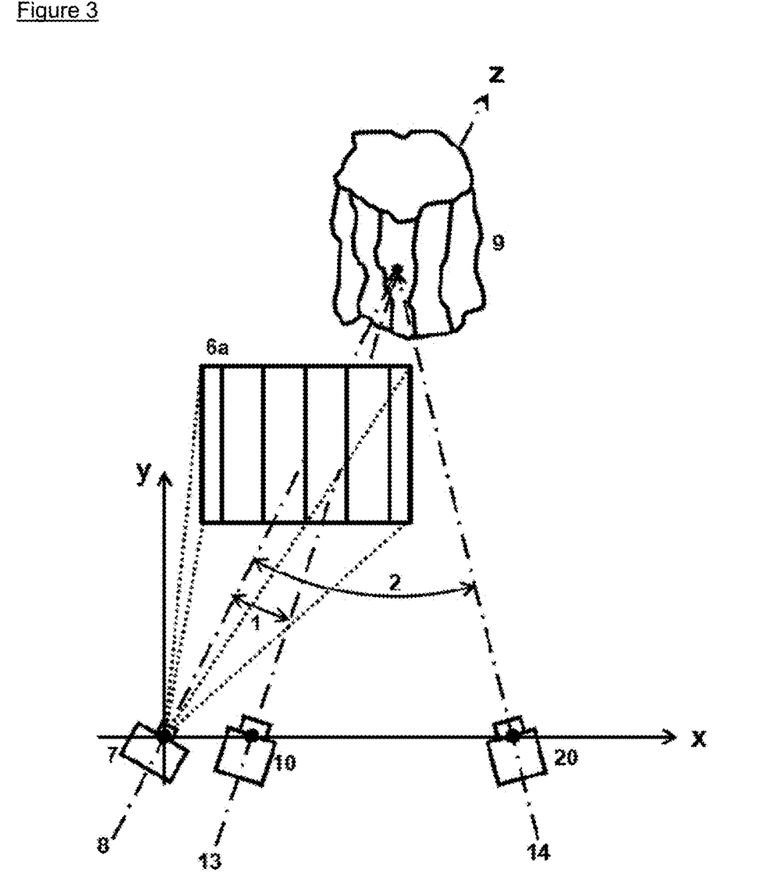
FIG. 3 is a diagrammatic view of an exemplary system with two cameras.

The invention solves this problem by introducing one or more additional cameras (10), (20), (30), . . . , and projecting line patterns (6), preferably with lines in a plurality of directions. The optical 3-D sensor consists of a sensor head (3) and a control and evaluation unit (4), as well as a display apparatus (5) for visualization purposes, according to FIG. 2. Below, an exemplary embodiment (see FIG. 3) of a 3-D sensor with two cameras (10) and (20) is intended to be described. The embodiment in which a pattern (6a) is projected with lines only along one direction is considered first. In FIG. 3, the line direction defines e.g. the y-direction of the coordinate system. In order to further increase the data density, an embodiment is further described, in which a pattern (6b) is projected with a cross grid, as shown schematically in FIG. 5. The directions of the lines define the x-direction and y-direction of the coordinate system in an exemplary manner. Without loss of generality, the projector (7) is situated at the coordinate origin. The optical axis (8) of the projector coincides with the z-axis of the coordinate system and is directed to the object (9).

For the embodiment according to FIG. 3, the two cameras (10) and (20) are arranged along the x-axis, with the optical axes (13) and (14) thereof preferably likewise being directed to the object (9) and including different triangulation angles (1) and (2) with the optical axis (8) of the projector (the z-axis). Thus, a sensor head (3) consisting of two triangulation sensors T1 and T2, which use the same projection pattern (6a), arises. The triangulation sensor T1 is defined by the projector (7) and the camera (10). The triangulation sensor T2 is defined by the projector (7) and the camera (20). If both cameras (10) and (20) each record an image of the object (9) illuminated by the pattern (6a) at the same time, the 3-D information of the object surface is acquired by two independent triangulation sensors T1 and T2 at the locations where the pattern (6a) is projected. What is important for the method is that the triangulation sensors T1, T2 measure the same object points.

A fundamental concept of the invention is that a 3-D sensor arises as a result of coupling the triangulation sensors (T1 and T2 in the exemplary embodiment of FIG. 3), said 3-D sensor acquiring the object surface both densely (many lines) and with a low measurement uncertainty $\delta z$ (large triangulation angle) and, at the same time, acquiring a large measurement depth $\Delta z$ in the single shot method.

By way of example, in the exemplary embodiment according to FIG. 3, this can be achieved by virtue of camera (10) being arranged at a small triangulation angle (1) and camera (20) being arranged at a large triangulation angle (2) along the x-axis. According to equation 1, a very large unique measurement depth $\Delta z_{T1}$ emerges for T1 for a number L of projected lines and a given measurement field $\Delta x$, i.e. the lines are correctly indexed. However, the 3-D data exhibit a large measurement uncertainty $\delta z_{T1}$ on account of the small triangulation angle (1). A lower unique measurement depth $\Delta z_{T2}$ with, at the same time, a lower measurement uncertainty $\delta z_{T2}$ arises for the sensor T2. However, on account of the lower unique measurement depth $\Delta z_{T2}$, the lines cannot be correctly indexed by the triangulation sensor T2 and the data are not uniquely evaluable without additional information.

According to the invention, the coupling of these two triangulation sensors may solve this problem. The coupling may be achieved by back projection of the data records of the triangulation sensors.

Initially, a 3-D model $M_1$ of the object is calculated from the data of T1. As described, this model exhibits a large measurement uncertainty but correct indexing of the lines. Now, all 3-D points of $M_1$, including the index information thereof, are projected back numerically onto the image of camera (20) of T2 from the 3-D space. In a calibrated overall system, the back-projected 3-D points will virtually correspond to the line signals in the image of the camera (20). Here, the back-projected 3-D points exhibit more noise but correct indices. These indices are now assigned to the lines in the camera image of T2. Using this, the data of T2 now may be evaluated uniquely and with a low measurement uncertainty, and a correct model $M_K$ of the object may be created. The restriction applying to each one of the triangulation sensors T1, T2 individually as a result of equation 1 is therefore lifted by the coupling for the 3-D sensor.

The basic idea of using two cameras and a small triangulation angle and a large triangulation angle with a line pattern with only one direction, as shown in (6a), is mentioned in the article [Willomitzer et al., "Single-shot 3D sensing with improved data density", Appl. Opt. 54(3), 408-417 (2015)].

The present disclosure develops the idea of advantageously using a plurality of cameras, in particular by using line patterns with a plurality of directions, which produces a large number of coupleable triangulation sensors in conjunction with a plurality of cameras.

Figure 4:
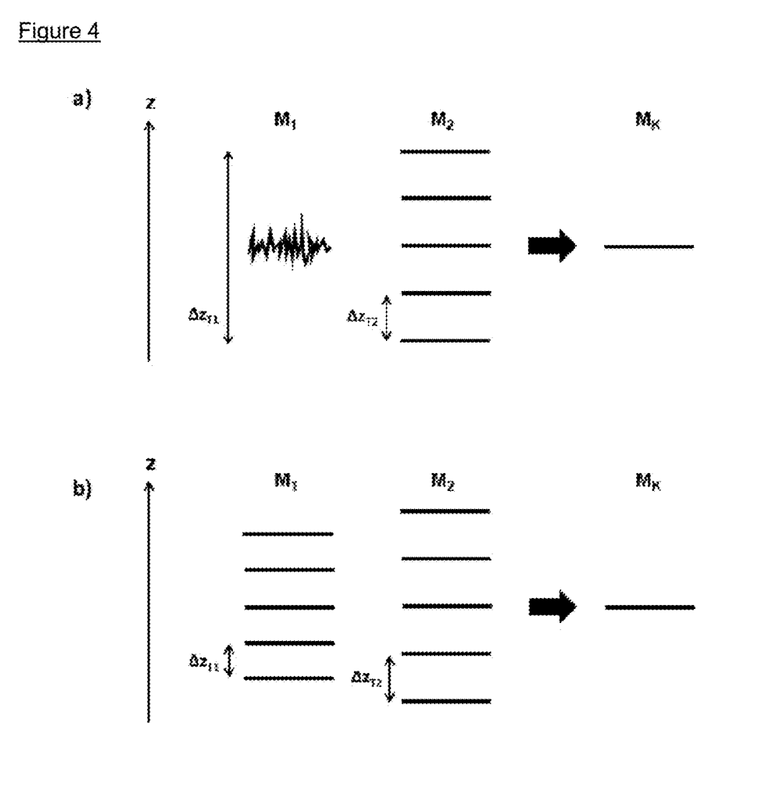
FIG. 4 illustrates how correspondences of $M_1$ and $M_2$ are sought in the 3-D space and the combined unique model $M_K$ is produced therefrom. Part a) shows a situation where $M_1$ is unique but noisy, and part b) symbolically shows the ambiguous models $M_1$ and $M_2$ of the data records of T1, T2 based on a plane object.

Nor is coupling by means of back projection restricted to the described embodiment with a small triangulation angle (1) and a large triangulation angle (2). It is also possible to select both triangulation angles to have approximately the same size such that, in the case of a fixed line number L, the unique measurement depths $\Delta z_{T1}$ and $\Delta z_{T2}$ (according to equation 1) are such that the correct line index may be ascertained with the aid of a residual number method, analogous to reading a Vernier scale (see FIG. 4*b*). By way of example, the selection of $\Delta z_{T1}$=300 mm and $\Delta z_{T2}$=400 mm would provide a resulting unique measurement range of 1200 mm. On the basis of the plane object, FIG. 4*b* symbolically shows the ambiguous models $M_1$ and $M_2$ of the data records of T1, T2. Coupling the data by way of the back projection permits ascertaining the "correct" model $M_K$.

In the aforementioned case of a small angle and a large angle, the ambiguous 3-D model $M_2$ of T2 may be calculated directly in addition to the calculation of the 3-D model $M_1$. Correspondences of $M_1$ and $M_2$ are sought after in the 3-D space and the combined unique model $M_K$ is produced therefrom. This is depicted symbolically in FIG. 4*a*, where $M_1$ is unique but noisy. The acquisition of a plane object is assumed, and the models $M_1$, $M_2$ and the combined unique model $M_K$ are shown.

Furthermore, coupling of T1 and T2 is also possible by way of features of the object, and also conceivable by combining the teaching of the patent with encoding of the patterns (e.g. spatially or by color).

Figure 5:
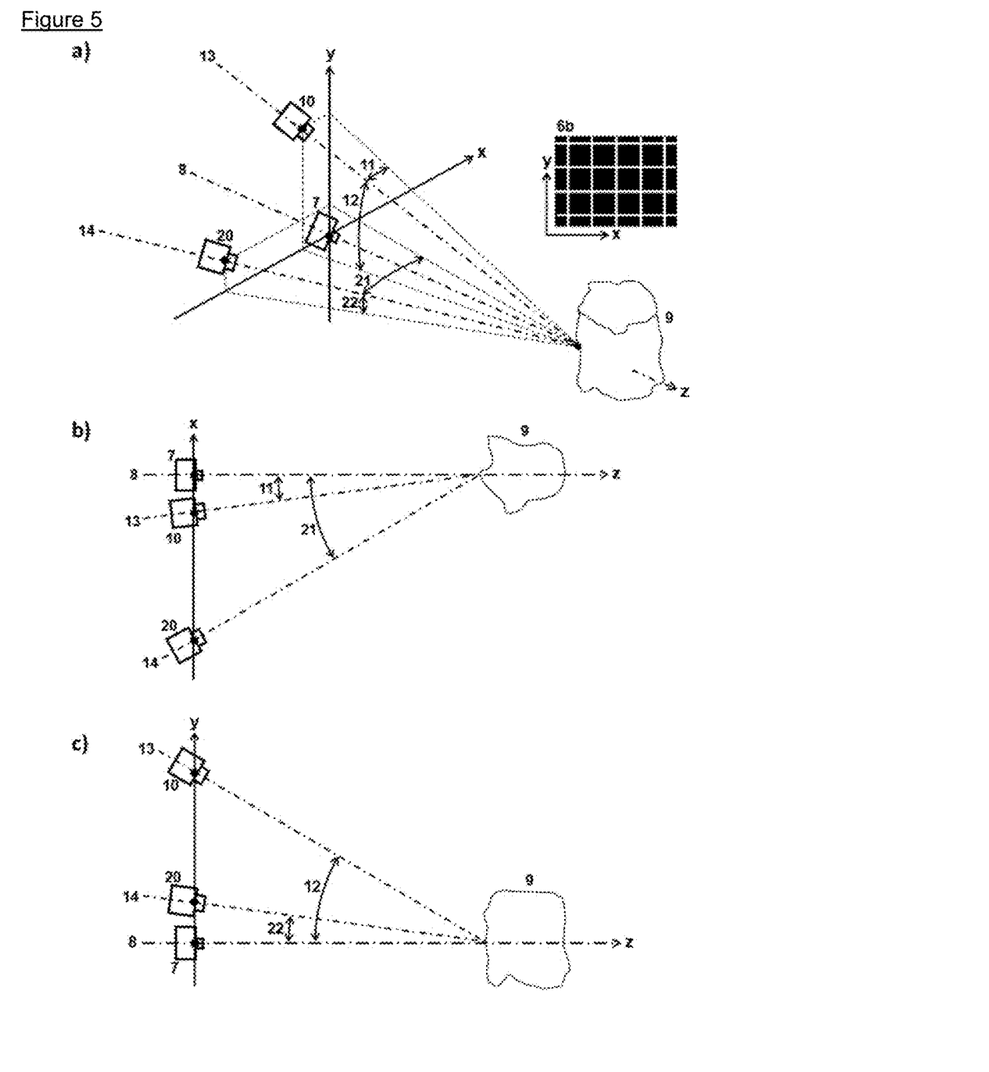
FIG. 5 is a schematic view showing an embodiment in which a pattern is projected with a cross grid.

In order to further increase the density of the measurement data with unchanging quality, the described embodiment of FIG. 3 may be modified. In so doing, a line pattern (6*b*), formed as a cross grid, is now projected in place of a line pattern (6*a*). In this case, the two line directions lie along the x-direction and y-direction of the coordinate axes in an exemplary manner. In principle, it would now be possible to add a further 3-D sensor, rotated by 90° in relation to the z-axis, in a manner analogous to the embodiment according to FIG. 3. There is a very effective possibility to achieve this without additional cameras according to the teaching of the patent document: if the cameras (10), (20), as shown in FIG. 5, are positioned next to the x-axis and y-axis, the optical axes (13), (14) thereof, which, once again are preferably directed to the object (9), span four angles (11), (12), (21), (22) with the xz-plane and yz-plane. These always act in a pairwise manner as triangulation angles for a projected line direction. Four independent triangulation systems T11, T12, T21, T22 are formed, which acquire at least 2 independent 3-D data records of the same surface points for each line direction. As a result, the teaching of the patent is already satisfied using two cameras instead of using four cameras.

FIG. 5*a* shows a spatial illustration of the 3-D sensor with the object (9) and a scheme of the projected pattern (6*b*). FIG. 5*b* shows a projection of the 3-D sensor onto the xz-plane; FIG. 5*c* shows a projection onto the yz-plane. Here, the angles (11) and (21) are triangulation angles for the lines in the y-direction (cf. FIG. 5*b*); the angles (12) and (22) are the triangulation angles for the lines in the x-direction (cf. FIG. 5*c*). As shown in FIG. 5, this allows an embodiment with four different triangulation angles for both projected line directions to be realized using only two cameras.

All methods for coupling triangulation systems by back projection, described for the embodiment according to FIG. 3, may analogously be applied to the embodiment according to FIG. 5.

The idea of the embodiment according to FIG. 5 may be extended without constraints to systems with more cameras or more line directions. As a matter of principle, Q=K×R triangulation systems may be produced using K cameras and R line directions. Depending on the position of the cameras and the line directions or the period of the line patterns, these Q triangulation systems exhibit different properties in respect of the unique depth range, the measurement uncertainty and the data density. These properties may also vary locally. The teaching of the patent allows many illumination options. It is by no means necessary to use a periodic pattern or only have two line directions. Other patterns, as shown in an exemplary manner at (6*c*), (6*d*), (6*e*), (6*f*) in FIG. 2, allow a multiplicity of variations. This is due to the projection axis (8), the camera axes (13), (14), (15), . . . and also the line directions or line segment directions determining the properties of the triangulation sensors. Coupling the triangulation sensors by way of the common observed line pattern and combining or coupling the respective data by the evaluation unit in turn permits the production of dense and, at the same time, accurate 3-D data of the object surface to be acquired.

This is easily comprehensible: it is possible to produce 6 different triangulation sensors T1 to T6 which acquire 6 independent data records of the same object using e.g. three line directions and two cameras. Therefore, 6 independent data records are available for removing possible errors in the data records, for example on account of lack of uniqueness or noise. Here, coupling by back projection is also applicable, similar to how it is depicted for two sensors in FIG. 4*a* and FIG. 4*b*. The 6 triangulation sensors T1 to T6 generate 6 non-unique 3-D models M1 to M6. In this case, the line patterns and triangulation angles may even be selected arbitrarily. This is because the models M1 to M6 should all show the same object model if they are error-free. If at least two or more data records correspond, there is a high probability for these data records to be correct. The described statistical method is particularly suitable for coupling if the projected line patterns are very complicated and if many triangulation sensors contribute.

The projection of a line pattern as in (6*c*) should be highlighted. A sensor with such a line pattern allows a further increase in the data density, both with two cameras as depicted in FIG. 4 and with an additional camera.

For projecting a plurality of grid line directions, it is also possible to project a different line period for each direction, for example by using line patterns like (6*e*) or (6*f*). In this case, according to equation 1, different unique measurement depths $\Delta z_{Ti}$ would result for the same triangulation angle.

Furthermore, the crossing points may be used for indexing in the case of a plurality of grid line directions. If the correct index of the line is known, the index of all lines intersecting this line at the crossing points is known. The relevant indices may be transferred to the remaining line segments by tracking the lines in the camera image. The selection of fitting line periods is effective, particularly for this embodiment.

Crossed lines further have the advantage that it is possible to calculate the gradient of the object surface in both directions at the crossing points. Using this, a very exact interpolation of the 3-D data in the interstices between the lines is possible. Moreover, the decomposition of an object surface into triangular meshes for cross grid projection is simpler and always unique.

In order to evaluate each line correctly and with a high accuracy, it is initially necessary to separate out line directions in the evaluation unit (4). By way of example, this may be carried out by means of directional filtering of the camera images in the Fourier plane or in real space. So that data may still be evaluated at the crossing points of the lines as well, it may be advantageous to increase or reduce, e.g. also set to zero, the intensity of the projected pattern at the crossing points in relation to the remaining line segments, or to vary the width of the lines at such locations. If the possibility of color selection exists for the employed cameras, the different line directions may also be separated, as a matter of principle, by suitable color encoding of the lines.

A peculiarity of the present teaching is that complete 3-D information about the shape of the surface is available immediately after each recording clock. This opens up possibilities for processing and visualizing in real time, as are not as advantageously available in the prior art:

First of all, the single shot method allows the three-dimensional capture of extremely fast processes, including the capture of moving, not even rigid objects or the measurement of the deformation in the case of crash tests. The image frequency of the camera restricts the fast acquisition only conditionally because the image scene may be captured in three dimensions within a very short period of time, which is significantly faster than permitted by the camera clock rate, by a short-term exposure (flash) or a short electronic shutter speed, as facilitated by modern cameras. This is possible because the illumination is carried out with a "fixed pattern". A fixed pattern which does not vary in time may be realized more effectively and significantly more easily from a technical point of view—and it allows arbitrarily short exposure. However, this does not exclude controllable pattern generators, e.g. laser projectors, which are very fast and permit a very bright projection, from being used for the pattern projection. Furthermore, in certain cases, the data density may be more important than the speed. In this case, a time sequential displacement of grids may be linked with the teaching of the patent.

The 3-D data being available immediately in time permits a real time representation and visualization such that the user of the sensor may guide the sensor interactively, for example continuously (without "stop and go"), around the object and, in the process, has control about the already supplied data at all times. Hence, the object may be measured comfortably and about the complete circumference, which would not readily be possible without the real time representation.

A photorealistic representation of the object, as may be achieved by known methods of surface decomposition into triangular meshes and rendering, even in real time, is advantageous for the interactive use of the sensor for virtual reality.

The additional acquisition of the color texture is also advantageous for the photorealistic representation. The presented method may be extended to this end, either by virtue of the cameras (10), (20), (30) . . . being color cameras or by virtue of an additional color camera being installed into the sensor. In the first case, the image data contain both the color texture and the 3-D data. The second case offers the advantage that black and white cameras generally facilitate a more accurate 3-D capture and the capture of the color texture is independent of the 3-D acquisition. Thus, it is also conceivable for the color texture to be completely independent of the 3-D data acquisition by appropriate large area, short-term white illumination at appropriate times. This is possible with both of the mentioned options.

A particularly important advantage of the single shot real-time data is the option of a visualization from different perspectives: a data record containing the complete 3-D data of the object surface is acquired in each camera clock. If a plurality of data records of a moving object are recorded in several sequential camera clocks, these may finally be visualized as a 3-D film sequence. Hence, the visualization of a 3-D film sequence (in real time or else subsequently) is possible under free selection of the observation perspective or even under changing the observation perspective during the 3-D film sequence ("free viewpoint movie"). In addition, the 3-D film sequence may be visualized simultaneously for arbitrary perspectives.

Figure 7:
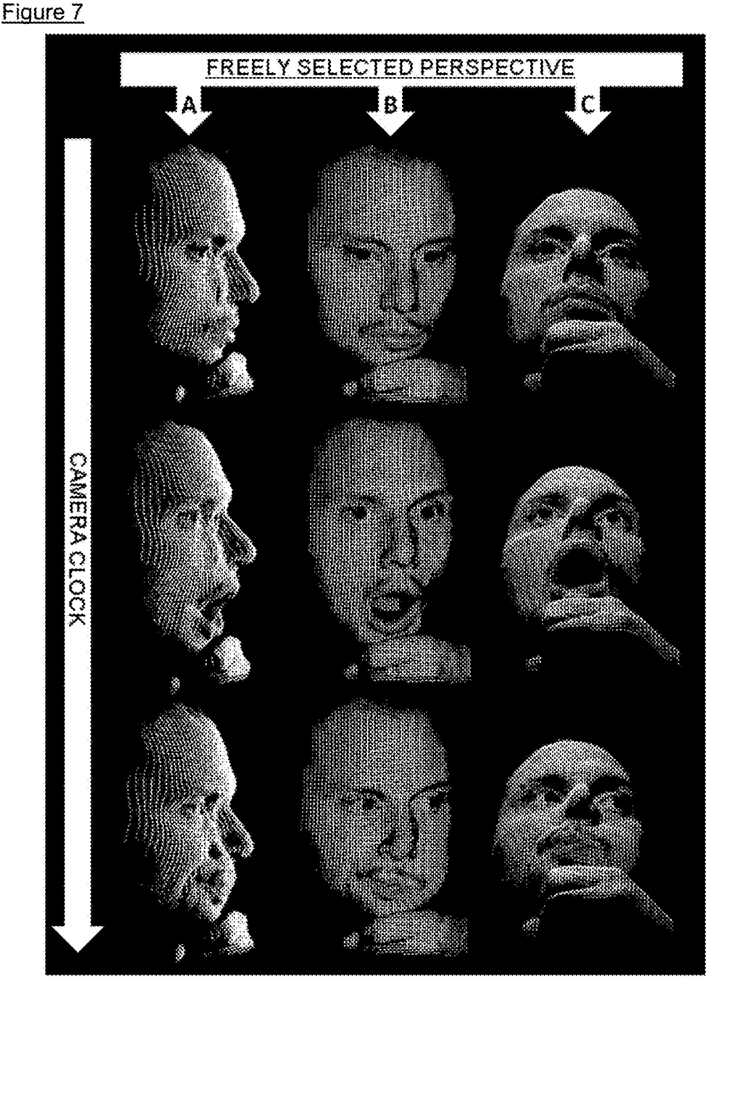
FIG. 7 illustrates three individual images of a 3-D film sequence from three different, freely selected perspectives (A, B, C).

This is demonstrated in FIG. 7. Shown are, in an exemplary manner, 3 individual images of a 3-D film sequence from 3 different, freely selected perspectives (A, B, C). The 3-D data for the imaged visualizations were acquired using the 3-D sensor of the embodiment according to FIG. 5. A talking person was measured.

The model and the visualization already contain the texture of the object because the line intensity is also captured on account of the local object reflectivity in the camera images. An interpolation of the data points between the lines or surface decomposition into triangular meshes was not applied in the example of FIG. 7, although this may take place, as a matter of principle, for a photorealistic representation.

The simplest option for varying the angle of view consists of the observer setting or varying the desired perspective in real time using a control appliance, e.g. a computer mouse.

Another option consists of a sensor (23) for capturing the observer position being attached to the monitor (5). If the observer moves in front of the monitor, the captured observer position may serve to depict the shown perspective in such a way as if the observer moves around the visualized object.

Figure 6:
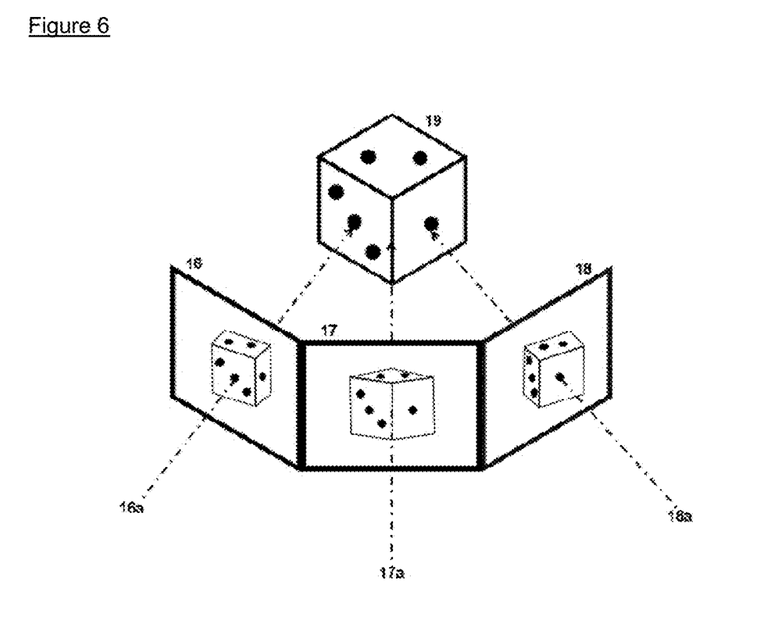
FIG. 6 shows the visualization of a plurality of perspectives on a plurality of monitors.

However, for example as depicted in FIG. 6, it is also possible to display the visualization of a plurality of perspectives on a plurality of monitors or on a curved monitor. The monitor (16) shows the virtual model (19) of the object from the direction (16a); the monitor (17) shows the model (19) from the direction (17a); the monitor (18) shows the model (19) from the direction (18a). Expediently, the monitors may be set up in such a way that one or more observers have the option of observing the monitors simultaneously or in succession as a result of movement and thus, as it were, of walking around the visualized object.

The aforementioned options for visualization may also be obtained with the aid of so-called VR data glasses.

Using the presented optical 3-D sensor, it is possible to measure objects once extremely quickly, for example for visual examination of fast processes in industry. However, it is also possible to capture moving scenes as a 3-D film sequence, for example for virtual reality.

The invention claimed is:

1. An optical single shot 3-D sensor for shape capture of an object in a 3-D space, the sensor comprising:
   a projector for projecting a line pattern onto the object, said projector having an optical axis, the line pattern having non-coded lines in a plurality of R line directions, with $R \geq 2$;
   a plurality of K cameras, each having a respective optical axis, where $K \geq 2$, said cameras being disposed to record an image of the object illuminated by said projector; and
   said K cameras being arranged to span with the projector up to $Q = K \times R$ triangulation systems with up to $Q = K \times R$ triangulation sensors with up to $Q = K \times R$ triangulation angles in respect of the R line directions; and
   a control and evaluation unit configured to process the images;
   said control and evaluation unit configured to produce 3-D models of the Q triangulation systems from images simultaneously obtained by said plurality of K cameras;

said control and evaluation unit configured to couple the 3-D models by seeking correspondences in the 3-D space and to produce a combined unique model therefrom.

2. The optical 3-D sensor according to claim 1, wherein:
said plurality of cameras are two cameras;
said projector is configured to project a cross grid with a multiplicity of lines onto the object;
directions of the lines define directions of an x-axis and a y-axis of a coordinate system;
the optical axes of said two cameras with an x-z or y-z plane of the coordinate system span four angles; and
the optical 3-D sensor contains four independently measuring triangulation systems T11, T12, T21, T22 with the triangulation angles which acquire two independent measurement data records of the same surface points for each line direction; and
said control and evaluation unit is configured to couple the measurement data records of said independently measuring triangulation systems.

3. The optical 3-D sensor according to claim 2, wherein:
the triangulation angles include triangulation angles (11), (12), (21), and (22), and the triangulation angles (12) and (21) are each selected to be larger than the triangulation angles (11) and (22), in that said
triangulation sensors T12 and T21 achieve a higher accuracy than said triangulation sensors T11 and T22 for the projected lines in the x-direction and in the y-direction;
the triangulation angles (11) and (22) are selected in such a way that uniqueness of the measurement data records of said triangulation sensors T11 and T22 in the measurement volume is immediately achieved in said triangulation systems T11 and T22, and
the measurement data records of the triangulation systems are coupled by forwarding the obtained information relating to the uniqueness.

4. The optical 3-D sensor according to claim 2, wherein:
the triangulation angles include triangulation angles (11), (12), (21), and (22), and the triangulation angles (12) and (21) are selected in such a way that the associated said triangulation sensors T12 and T21 achieve a predetermined accuracy for the projected lines in the x-direction and in the y-direction,
the triangulation angles (11) and (22) are selected in such a way that, for the triangulation systems T11 and T22 according to equation $$L \le \frac{\Delta x}{\Delta z \cdot \tan\theta}$$

unique measurement depths of T11 and T22 in the case of a fixed line number L are such that the correct line index may be ascertained with the aid of a residual number method, analogously to reading a Vernier scale.

5. The optical 3-D sensor according to claim 1, wherein one or more said cameras are color cameras or color cameras are additionally introduced in order to acquire information about a color texture of the object surface in addition to capturing the 3-D data.

6. The optical 3-D sensor according to claim 1, wherein a period of the projected line pattern varies locally or for different directions.

7. The optical 3-D sensor according to claim 1, wherein the sensor is configured to acquire 3-D data with a camera clock rate and produce a 3-D model of the object therefrom in each case, wherein a series of 3-D models produced in succession forms a 3-D film sequence to be played back on a display.

8. The optical 3-D sensor according to claim 1, wherein a viewing angle when displaying the acquired data as a 3-D model is controlled by a sensor in real time, said sensor being configured to ascertain a position of an observer.

9. The optical 3-D sensor according to claim 1, which further comprises a display device which forms the 3-D model produced by the control and evaluation unit from a plurality of viewing angles for simultaneous display purposes.

10. The optical 3-D sensor according to claim 1, wherein the 3-D models of the Q triangulation systems produced by said control and evaluation unit are non-unique 3-D models of the Q triangulation systems.

11. The optical 3-D sensor according to claim 1, wherein the 3-D models of the Q triangulation systems exhibit different properties with respect to a unique depth range, a measurement uncertainty and a data density.

12. A single shot method for producing a 3-D model of an object, the method comprising:
projecting, from a projector, a line pattern onto the object, wherein the projector has an optical axis, and the line pattern has non-coded lines in a plurality of R line directions, with $R \ge 2$;
providing a plurality of K cameras, each having a respective optical axis, where $K \ge 2$, wherein the cameras are disposed to record an image of the object illuminated by the projector;
arranging the K cameras such that the K cameras and the projector span $Q=K \times R$ triangulation systems with $Q=K \times R$ triangulation sensors and with $Q=K \times R$ triangulation angles in respect of the R line directions;
using a control and evaluation unit to produce a 3-D model for each of the Q triangulation systems from images that are obtained simultaneously from the K cameras, thereby selecting the triangulation systems such that the 3-D models are independent of one another; and
coupling the 3-D models in the control and evaluation unit by seeking correspondences in the 3-D space and producing a combined unique model therefrom.

13. An optical single shot 3-D sensor for shape capture of an object in a 3-D space, the sensor comprising:
a projector for projecting a line pattern onto the object, said projector having an optical axis, the line pattern having non-coded lines in a number of R line directions, with $R \ge 1$;
a plurality of K cameras, each having a respective optical axis, where $K \ge 2$, said cameras being disposed to record an image of the object illuminated by said projector; and
said K cameras being arranged to span with the projector up to $Q=K \times R$ triangulation systems with up to $Q=K \times R$ triangulation sensors with up to $Q=K \times R$ triangulation angles in respect of the R line directions; and
a control and evaluation unit configured to process the images;
said control and evaluation unit configured to produce non-unique 3-D models of the Q triangulation systems from images simultaneously obtained by said plurality of K cameras;
for at least line direction, at least one triangulation angle is selected in such a way that the associated said triangulation sensor for the associated line direction achieves a predetermined accuracy;

and for the said line direction at least one further triangulation angle is selected in such a way that, for the associated triangulation system according to equation $$L \leq \frac{\Delta x}{\Delta z \cdot \tan\theta} \qquad 5$$

a unique measurement depth in the case of a fixed line number L is such that the correct line index may be ascertained with the aid of a residual number method, analogously to reading a Vernier scale.

\* \* \* \* \*